United States Patent
Dias et al.

(10) Patent No.: US 12,255,949 B2
(45) Date of Patent: Mar. 18, 2025

(54) SEGMENTATION SERVER CLUSTER FOR MANAGING A SEGMENTATION POLICY

(71) Applicant: Illumio, Inc., Sunnyvale, CA (US)

(72) Inventors: Antonio Pedro Alexandre Rainha Dias, Sunnyvale, CA (US); Joel E. Vanderkwaak, Mountain View, CA (US); Bryan Patrick Pelham, Pleasanton, CA (US); Mukesh Gupta, Fremont, CA (US); Juraj George Fandli, Campbell, CA (US); Charles Zou Liu, Sunnyvale, CA (US); Thukalan V. Verghese, San Carlos, CA (US); Paul James Kirner, Palo Alto, CA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

(21) Appl. No.: 16/113,706

(22) Filed: Aug. 27, 2018

(65) Prior Publication Data
US 2019/0089773 A1    Mar. 21, 2019

Related U.S. Application Data

(60) Provisional application No. 62/561,179, filed on Sep. 20, 2017.

(51) Int. Cl.
*H04L 67/101* (2022.01)
*G06F 9/50* (2006.01)

(52) U.S. Cl.
CPC .......... *H04L 67/101* (2013.01); *G06F 9/5077* (2013.01); *G06F 9/5083* (2013.01)

(58) Field of Classification Search
CPC ..... H04L 67/101; G06F 9/5077; G06F 9/5083
USPC .......................................... 709/201
See application file for complete search history.

(56) References Cited

U.S. PATENT DOCUMENTS

| | | |
|---|---|---|
| 2017/0199770 A1 | 7/2017 | Peteva et al. |
| 2017/0264493 A1* | 9/2017 | Cencini ................. G06F 9/5083 |
| 2018/0176252 A1* | 6/2018 | Nimmagadda ..... H04L 41/0893 |

OTHER PUBLICATIONS

PCT International Search Report and Written Opinion, PCT Application No. PCT/US18/48140, Dec. 11, 2018, 14 pages.

* cited by examiner

*Primary Examiner* — Suraj M Joshi
(74) *Attorney, Agent, or Firm* — Fenwick & West LLP

(57) ABSTRACT

A segmentation system includes a cluster of segmentation servers that interoperate to obtain and manage a segmentation policy for controlling communications between workloads in an administrative domain. The cluster of segmentation servers includes a leader segmentation server and at least one member segmentation server. The leader segmentation server controls policy generation and distributes the segmentation policy to the member segmentation servers. The segmentation servers are each optionally paired with a respective set of workloads. The segmentation servers each distribute descriptions of their respective paired workloads to the other segmentation servers. Each segmentation server processes the segmentation policy to generate management instructions for controlling communications to and from their respective paired workloads and distributes the management instructions to the operating system instances executing the workloads to enforce the segmentation policy. The cluster of segmentation servers beneficially enables a segmentation system with high scalability, reliability, and efficiency.

19 Claims, 7 Drawing Sheets

SEGMENTATION SERVER CLUSTER FOR MANAGING A SEGMENTATION POLICY

RELATED APPLICATIONS

This application claims priority to U.S. Provisional Application No. 62/561,179 filed on Sep. 20, 2017, which is incorporated by reference herein.

BACKGROUND

Technical Field

This application relates to managing a segmentation policy that controls communications between workloads.

Description of Related Art

A segmentation policy comprises a set of rules that control which workloads may communicate on a network and may place restrictions on how such workloads may communicate. As the number of workloads in an administrative domain grows, so does the complexity of managing the segmentation policy. Traditionally, a segmentation server manages the segmentation policy and distributes management instructions to workloads to enforce the policy. However, reliance on a single segmentation server to manage a segmentation policy may cause challenges relating to scalability as the number of workloads grows and reliability in the case that the segmentation server fails.

SUMMARY

A system, non-transitory computer-readable storage medium, and method manages a segmentation policy. A segmentation system includes a leader segmentation server and at least one member segmentation server. The leader segmentation server obtains a segmentation policy and distributes the segmentation policy to a plurality of member segmentation servers. A first member segmentation server of the plurality of member segmentation servers receives the segmentation policy from the leader segmentation server. The first member segmentation server is paired with a first plurality of paired workloads. The first member segmentation server generates, based on the segmentation policy, first management instructions for controlling communications of the first plurality of paired workloads in accordance with the segmentation policy. The first member segmentation server distributes the first management instructions to first operating system instances executing the first plurality of paired workloads to enable the first operating system instances to enforce the segmentation policy with respect to the first plurality of paired workloads. A second member segmentation server of the plurality of member segmentation servers is paired with a second plurality of paired workloads. The second member segmentation server generates, based on the segmentation policy, second management instructions for controlling communications of the second plurality of paired workloads in accordance with the segmentation policy. The second member segmentation server distributes the second management instructions to second operating system instances executing the second plurality of paired workloads to enable the second operating system instances to enforce the segmentation policy with respect to the second plurality of paired workloads.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

A segmentation system includes a cluster of segmentation servers that interoperate to obtain and manage a segmentation policy for controlling communications between workloads in an administrative domain. The cluster of segmentation servers includes a leader segmentation server and at least one member segmentation server. The leader segmentation server controls policy generation and distributes the segmentation policy to the member segmentation servers. The member segmentation servers (and optionally the leader segmentation server) are each paired with a respective set of workloads. Each segmentation server processes the segmentation policy to generate management instructions for controlling communications to and from their respective paired workloads and distributes the management instructions to enforcement modules on the operating system instances executing the workloads to enforce the segmentation policy. The cluster of segmentation servers beneficially enables a segmentation system with high scalability, reliability, and efficiency.

Figure 1:
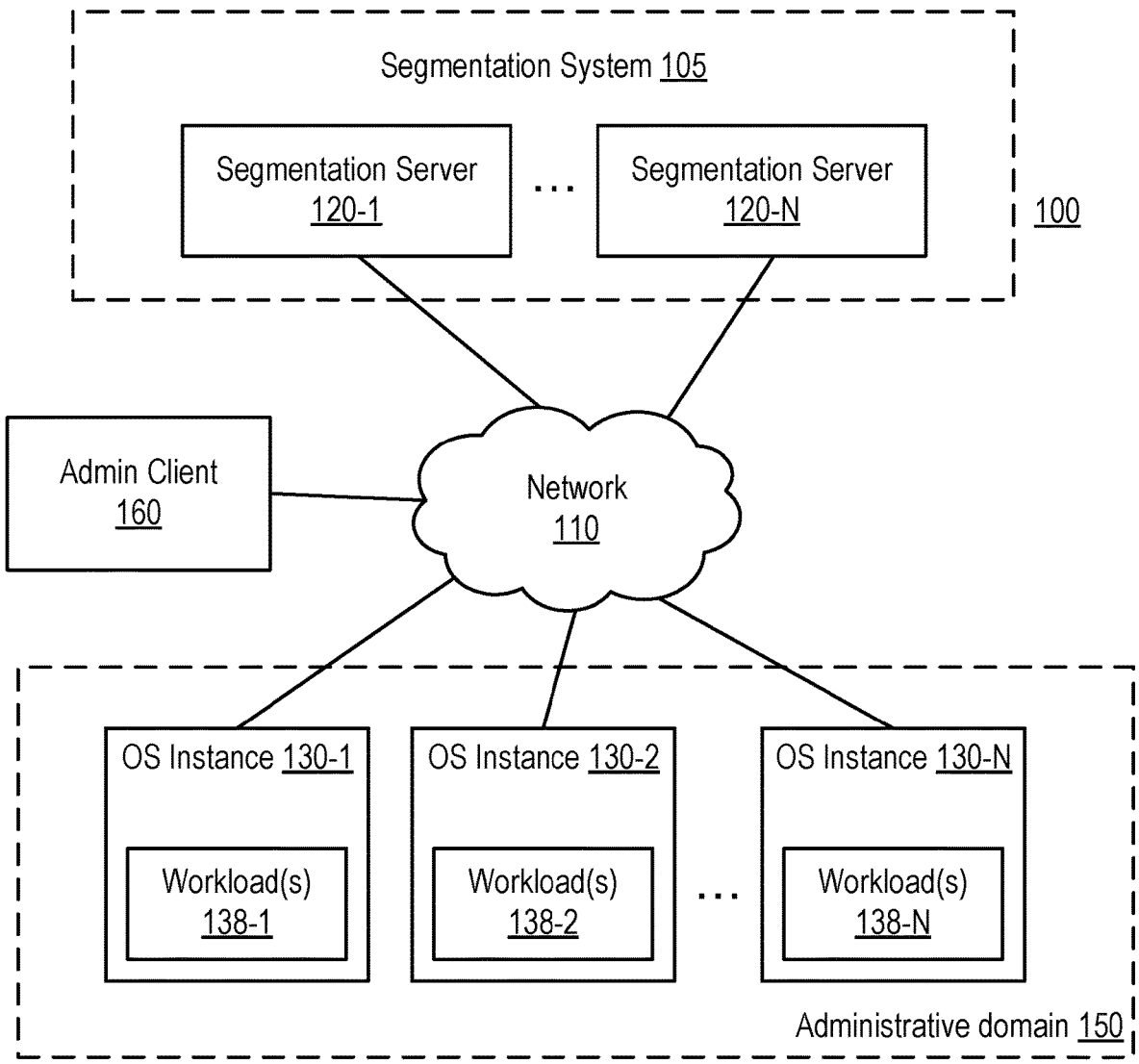
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation system 105 including a plurality of segmentation servers 120-1, ..., 120-N (collectively referenced herein as a segmentation server 120), a network 110, an administrative client 160, and an administrative domain 150 that includes a plurality of operating system (OS) instances 130 (e.g., OS instances 130-1, 130-2, ..., 130-N). The administrative domain 150 can correspond to an enterprise such as, for example, a service provider, a corporation, a university, or a government agency under control of the segmentation server 120.

The network 110 represents the communication pathways between the segmentation servers 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

The segmentation system 105 comprises a plurality of segmentation servers 120 that each comprise a computing device, a virtual machine, a container, or application instance. The segmentation system 105 obtains and stores information about the OS instances 130 on the network 120 and the workloads 138 executing on the OS instances 130. The segmentation system 105 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation system 105 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the workload within the administrative domain. <br> V: web, API, database |
| Environment | M: The lifecycle stage of the workload. <br> V: production, staging, development |
| Application | M: The logical application (higher-level grouping of workloads) to which the workload belongs. <br> V: trading, human resources |
| Line of Business | M: The business unit to which the workload belongs. <br> V: marketing, engineering |
| Location | M: The location of the workload. Can be physical (e.g., country or geographical region) or logical (e.g., network). Physical is particularly useful for expressing geographic compliance requirements. <br> V: US or EU (physical), us-west-1 or us-east-2 (logical) |
| User Group | M: The user group containing the user logged onto the workload. <br> V: Engineers, Contractors, Managers, System Administrators |

The segmentation system 105 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation system 105 may retain a repository storing information about the OS instances 130 and the workloads 138 managed by the segmentation system 105. For example, the segmentation system 105 may store, for each OS instance 130, an OS instance identifier that uniquely identifies the OS instance 130, workload identifiers for workloads 138 associated with the OS instance 138, and membership information indicating one or more groups of workloads 138 to which each workload 138 belong (e.g., as defined by the respective label sets for the workloads 138).

Table 2 illustrates an example of information stored by the segmentation system 105. Here, the "ID" represents the OS instance identifier for each OS instance 130. The workload ID(s) represent the workload identifier for the workload(s) 138 executing on each OS instance 130. If only a single workload executes on a particular OS instance 130, the workload ID may be synonymous with the OS instance ID (e.g., in the case of ID1 and IDn). If more than one workload 138 executes on a given OS instance 130, the workload ID may include the OS instance ID in combination with a sub-identifier for the workload 138 (e.g., in the case of ID2). The sub-identifier may comprise, for example, an IP address or other identifier that uniquely identifies the workload 138 when taken in combination with the identifier for the OS instance 130. The memberships represent groups to which one or more workloads 138 executing on the OS instance 130 belongs. Each group may correspond to a unique label set involving one or more dimensions.

TABLE 2

Example of a Repository Table

| OS Instance ID | Workload ID(s) | Memberships |
|---|---|---|
| ID1 | ID1 | A, C, D |
| ID2 | ID2 + subID1 | B, C |
|  | ID2 + subID2 | D |
| . | . | . |
| . | . | . |
| . | . | . |
| IDn | IDn | B, D, E, F |

Instead of enforcing the segmentation policy at a centralized device, the segmentation policy is instead enforced by at least a subset of the OS instances 130. To enable enforcement of the segmentation policy, the segmentation system 105 generates a set of management instructions and distributes the management instructions to the OS instances 130 capable of enforcing the segmentation policy. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation system 105 may send different management instructions to different OS instances 130 so that each OS instance 130 gets only the management instructions relevant to its operation. Here, the segmentation system 105 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation system 105 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 110 and view traffic flows between the workloads 138.

Figure 2:
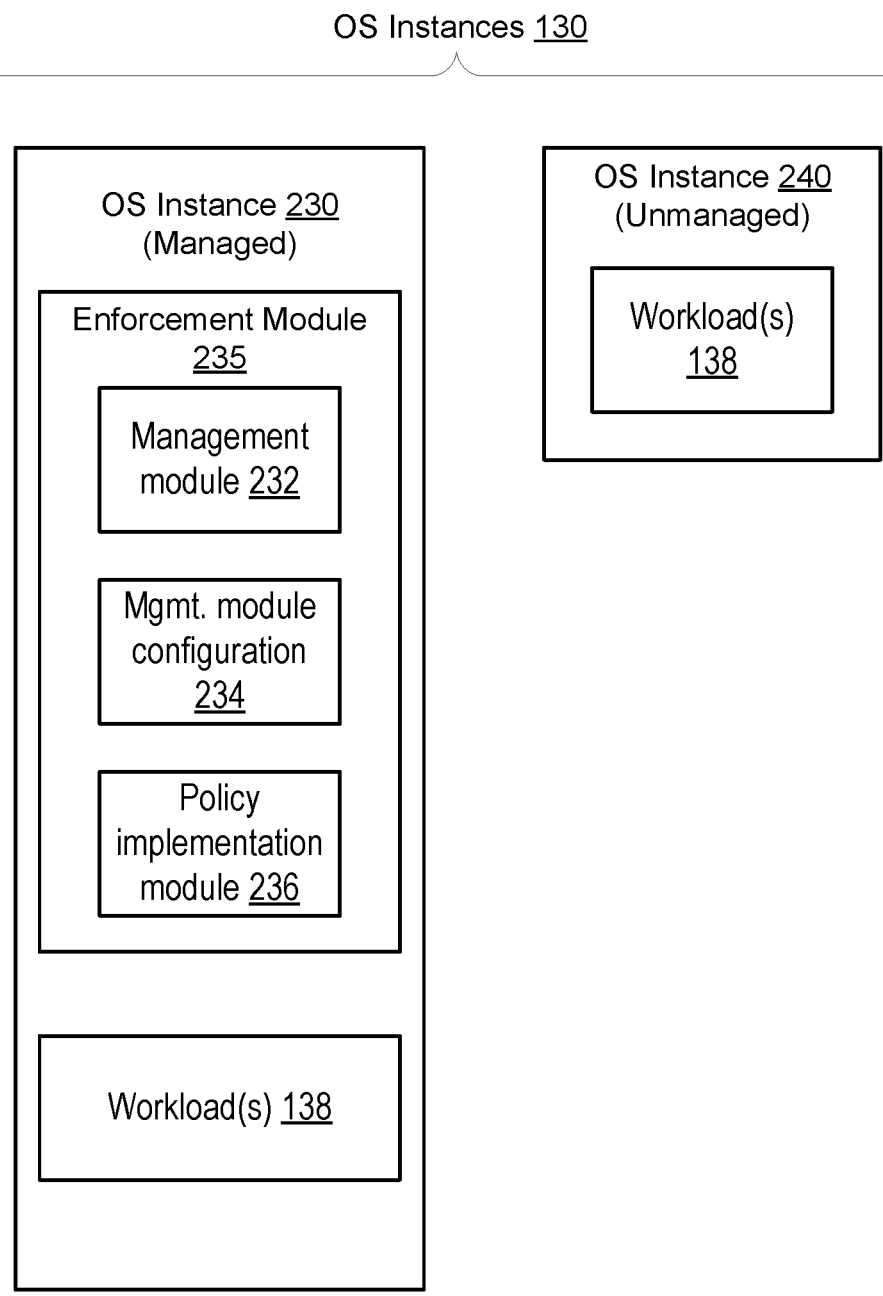
FIG. 2 is a block diagram illustrating example embodiments of operating system instances.

FIG. 2 illustrates example embodiments of OS instances 130. An OS instance 130 may correspond to a managed OS instance 230 or an unmanaged OS instance 240. An enforcement module 235 executes on a managed OS instance 230 that includes a management module 232, a management module configuration 234, and a policy implementation module 236. The management module 232 comprises a low-level network or security engine that controls incoming and outgoing traffic associated with each of the workloads 138 executing on the managed OS instance 230. For example, the management module 232 may include an operating system-level firewall, an Internet Protocol security (IPsec) engine, or a network traffic filtering engine (e.g., based on the Windows Filtering Platform (WFP) development platform). The management module 232 on a given managed OS instance 230 restricts communications to or from the workloads 138 executing on the given managed OS instances 230 based on the management module configuration 234. For example, the management module 232 may permit a particular workload 138 to communicate with a limited set of workloads 138 on other OS instances 130 (on managed OS instances 230 or unmanaged OS instances 240), and may block all other communications. Furthermore, the management module 232 may place restrictions on how each workload 138 is permitted to communicate. For example, for a particular workload 138, the management module 232 may enable the workload 138 to communicate using only encrypted protocols and block any unencrypted communications.

The policy implementation module 236 receives the management instructions from the segmentation server 120 and translates the management instructions from a high level of abstraction to a low level of abstraction represented by the management module configuration 234. For example, the policy implementation module 236 may obtain the relevant rules and relevant membership information from the management instructions, and identify the specific workloads 138 and services controlled by the rules. The policy implementation module 236 then generates a management module configuration 234 that enables the management module 232 to enforce the management instructions.

In contrast to the managed OS instance 230, the unmanaged OS instance 240 does not include an enforcement module 235 and is unable to directly contribute to enforcement of the segmentation policy. Nevertheless, the unmanaged OS instances 240 may still be affected by the segmentation policy because the managed OS instances 230 may limit communications of its workloads 138 with workloads 138 on the unmanaged OS instance 240. Thus, communications between workloads 138 on managed OS instances 230 and unmanaged OS instances 240 may be controlled by the segmentation policy by enforcing the rules at the enforcement modules 235 of the managed OS instances 230.

In some embodiments, the segmentation policy may also be effectively enforced on an unmanaged OS instance 240 by an enforcement module 235 executing on a separate device external from the unmanaged OS instance 240. For example, an enforcement module 235 may execute on an upstream switch port or other device that may control communications to and from workloads 138 on a downstream unmanaged OS instance 240. In this case, management instructions pertaining to workloads 138 on unmanaged workloads 138 may be distributed to the enforcement modules 235 external to the unmanaged OS instances 240 that control communications to and from the workloads 138 on the unmanaged OS instances 240.

Figure 3:
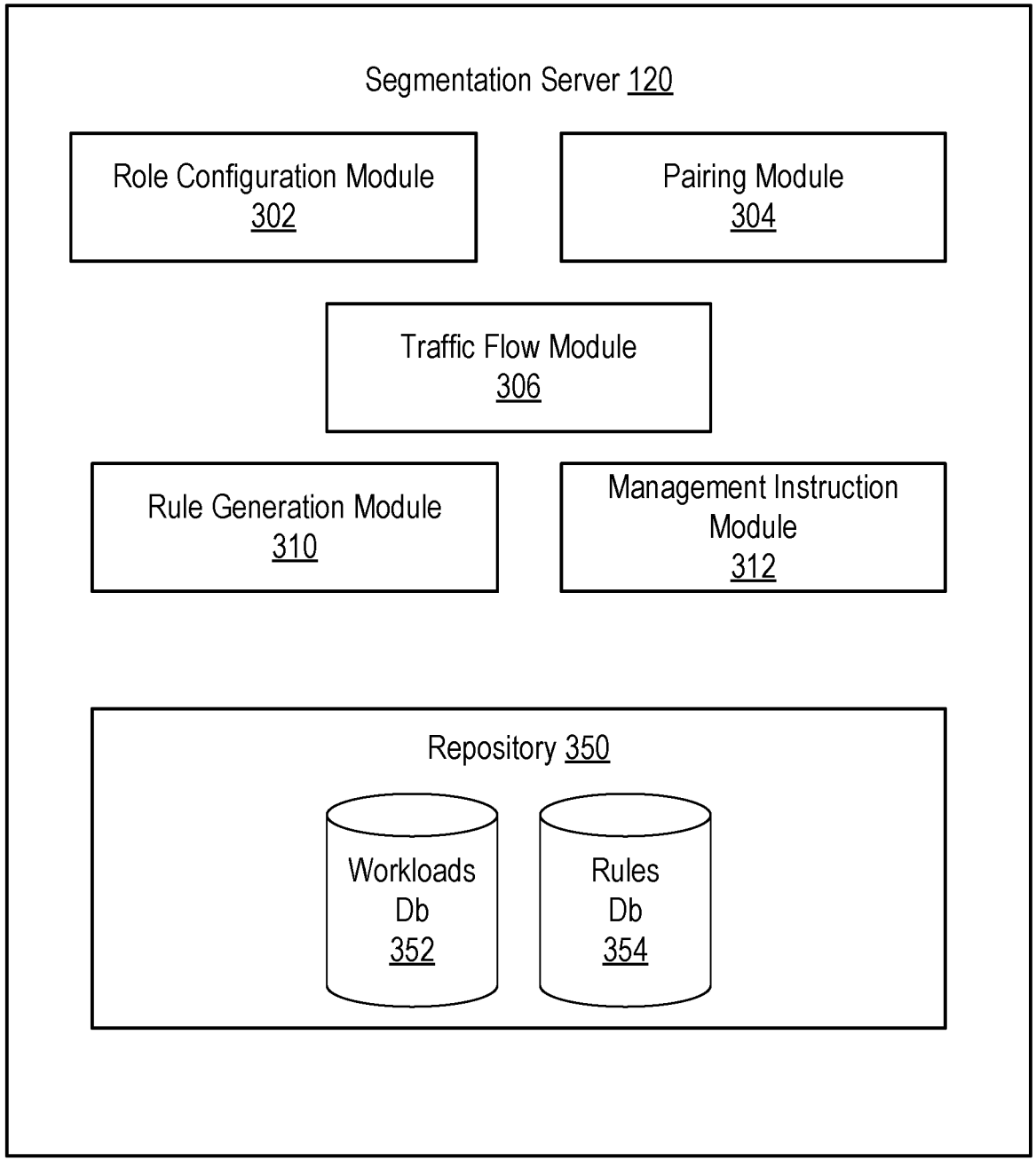
FIG. 3 is a block diagram illustrating an example embodiment of a segmentation server.

FIG. 3 is a high-level block diagram of an embodiment of a segmentation server 120 that may operate in a cluster of segmentation servers making up the segmentation system 105. The segmentation server 120 comprises a role configuration module 302, a pairing module 304, a traffic flow module 306, a rule generation module 310, a management instruction module 312, and a repository 350. The repository 350 may comprise a workloads database 352 that stores associations between workloads 138 and their respective label sets and a rule database 354 that stores a segmentation policy as a set of rules. In alternative embodiments, the segmentation server 120 may include different or additional components. The various components of the segmentation server 120 may be implemented as one or more processors and a non-transitory computer-readable storage medium that stores instructions executed by the one or more processors to carry out the functions attributed to the segmentation server 120 described herein.

The role configuration module 302 configures a role of the segmentation server 120 as either a leader segmentation server or a member segmentation server. The role of the segmentation server 120 affects the functions it performs and how it interoperates with other segmentation servers 120 in the segmentation system 105 as will be described in further detail below.

The pairing module 304 controls pairing of workloads 138 with the segmentation server 120. In response to receiving a pairing request from a workload 138, the pairing module 304 authenticates the workload 138 (e.g., based on a received pairing key) and adds the workload 138 to the workloads database 352. The pairing module 304 may furthermore generate and store a workload description describing a label set for the workload 138, an identifier for the workload 138 (e.g., an IP address), or other pertinent information relating to the workload 138. The pairing module 304 may furthermore assign labels to the newly paired workload 138. As will be described in further detail below, the segmentation server 120 generates and distributes management instructions only for workloads 138 that are paired with the segmentation server 120.

The traffic flow module 306 monitors traffic between workloads 138 paired with the segmentation server 120 and generates a traffic flow graph representing the monitored traffic. For example, the traffic flow module 306 may identify each pair of workloads 138 (of which at least one is paired with the segmentation server 120) that communicate with each other during a particular time period. For each detected traffic flow between a pair of workloads 138, the traffic flow module 306 may identify what services are communicated between the pair of workloads 138 and the corresponding ports and protocols used in the communications. Furthermore, the traffic flow module 306 may identify statistical information relating to the traffic flow between a pair of workloads 138 such as, for example, a volume of data transferred between the pair of workloads within a particular time period, a frequency of communications between the pair of workloads 138, a duration of communications between the pair of workloads 138, or other statistical information indicative of the extent of the communications. The traffic flow module 306 may generate a data structure representing the traffic flows in the form of a traffic flow graph in which each workload 138 is represented by a node and a traffic flow between a pair of workloads 138 is represented by an edge connecting the respective nodes corresponding to the connected pair of workloads 138. The nodes may store information relating to the workloads 138 and the edges may store information relating to the traffic flow such as the port number, service, process, protocol, or combination thereof associated with the traffic flow.

In an embodiment, functions of the traffic flow module 306 are dependent on the assigned role of the segmentation server 120. When configured as a member segmentation server, the traffic flow module 306 may generate a local traffic flow graph pertaining to traffic to and from workloads 138 paired with the segmentation server 120 and send the local traffic flow graph to a leader segmentation server upon receiving a query for the local traffic flow graph. When configured as a leader segmentation server, the traffic flow module 306 may query member segmentation servers within the segmentation system 105 for their respective local traffic flow graphs and aggregate the local traffic flow graphs into a global traffic flow graph. A leader segmentation server 120 may furthermore generate a visual representation of the local traffic flow graph and provide the visual representation to an administrative client 160 for display. Further details relating to the roles of the segmentation servers 120 within a segmentation system 105 are provided below.

The rule generation module 310 automatically generates or updates a segmentation policy comprising a set of rules. The particular strategy for generating the rules may be based on configuration settings, the observed traffic flow graph, or a combination thereof. In general, the rule generation module 310 generates rules that when enforced will allow at least the traffic flows in the traffic flow graph. The rules may also allow traffic flow beyond that specifically observed in the traffic flow graph depending on the level of permissiveness specified in the configuration settings. For example, the rule generation module 310 may generate the most permissive rules allowed by the configuration settings. Generating rules based on the observed traffic flow graph is beneficial because, assuming that there are no abnormal or malicious communications in the administrative domain 150 in the observed traffic flow graph, the rule generation module 310 can produce a set of rules that permits communications observed during normal operation of the workloads 138 in the administrative domain 150 while blocking or limiting abnormal communications that are potentially malicious.

In an embodiment, the rule generation module 310 operates only on a segmentation server 120 configured as a leader segmentation server and may be disabled or omitted on segmentation servers 120 configured as member segmentation servers. In a leader segmentation server role, the rule configuration module 302 may distribute the generated rules to member segmentation servers 120 in the segmentation system 105 as will be described in further detail below.

The management instruction module 312 generates the management instructions from the rules for a current segmentation policy and distributes the relevant management instructions to the enforcement modules 235 as described above. In an embodiment, the management instruction module 312 generates and distributes the relevant management instructions to the enforcement modules 235 of workloads 138 paired with the segmentation server 120.

The workloads database 352 stores workload descriptions for each of the workloads 138 in the administrative domain 150. The workload descriptions may include information such as, for example, labels assigned to the workloads 138, an IP address of the workloads, or other configuration information associated with the workloads 138. In an embodiment, each segmentation server 120 in a segmentation system 105 stores workload descriptions for all workloads 138 in the administrative domain 150 regardless of whether or not the workload 138 is paired with the particular segmentation server 120 as will be described in further detail below.

The rules database 354 stores the rules of the segmentation policy. As described in further detail below, the rules may be generated on a segmentation server 120 configured as a leader segmentation server and the rules may be replicated to the respective rules databases 354 of the member segmentation servers.

Figure 4:
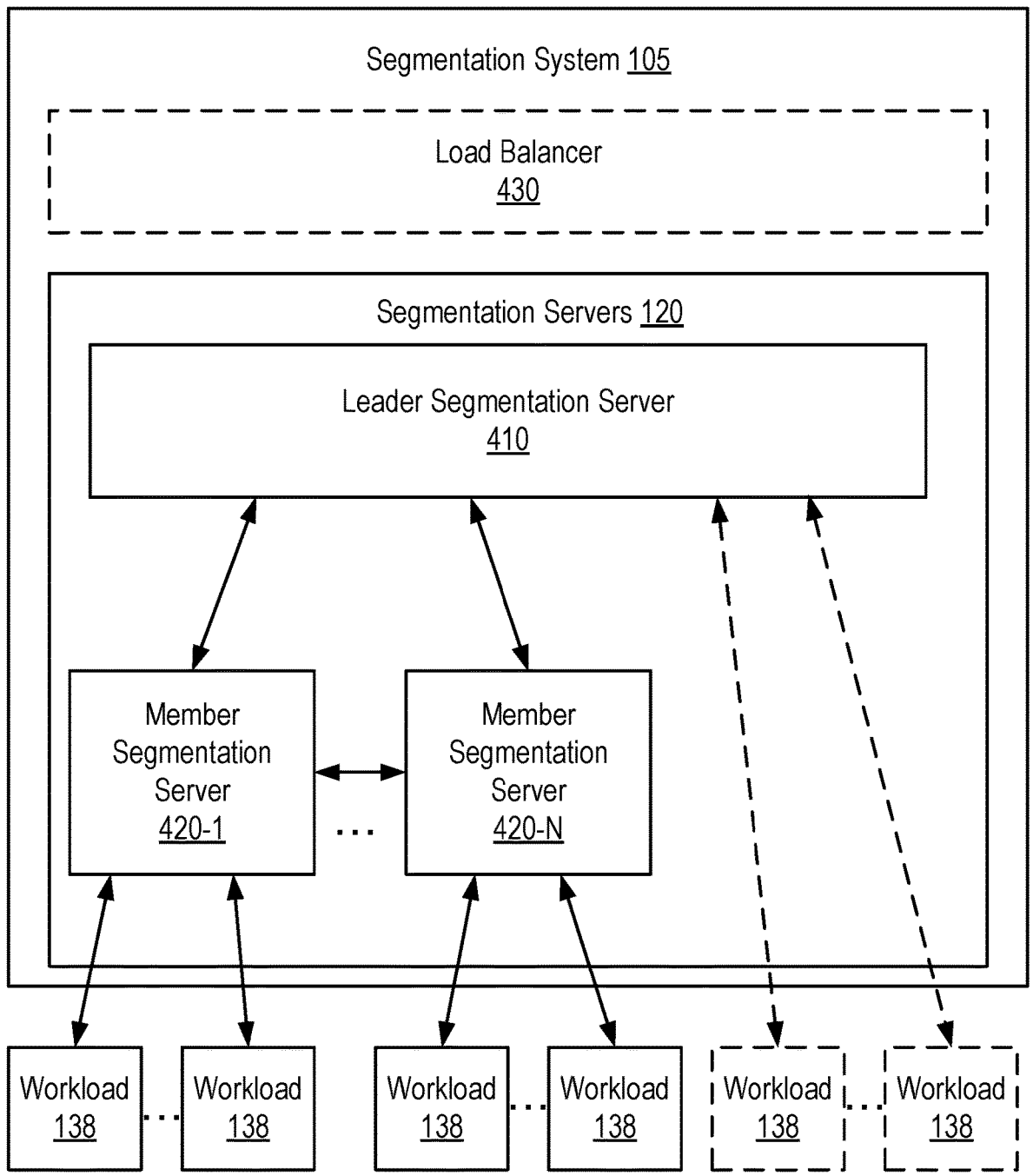
FIG. 4 is a block diagram illustrating an example embodiment of a segmentation system comprising a cluster of segmentation servers.

FIG. 4 illustrates an example embodiment of a logical arrangement of a segmentation system 105. The segmentation system 105 comprises a cluster of segmentation servers 120 that are interconnected and work together to collectively manage a set of workloads 138 in an administrative domain. The segmentation system 105 comprises a leader segmentation server 410 and one or more member segmentation servers 420 (e.g., member segmentation servers 420-1, . . . , 420-N). A segmentation system 105 may generally be configured to have any number of member segmentation servers 420, but typically has one and only one leader segmentation server 410. The roles of the segmentation servers 120 may be configurable and may be changed dynamically, either manually or automatically. For example, in certain situations, a member segmentation server 420 may be reconfigured to become a leader segmentation server 410 or a leader segmentation server 410 may be reconfigured to become a member segmentation server 420.

The member segmentation servers 420 and the leader segmentation server 410 are each paired with and manage a respective set of workloads 138. The segmentation policy is controlled by the leader segmentation server 410 and distributed to the member segmentation servers 420. In an embodiment, the leader segmentation server 410 provides a central user interface that can be accessed by the admin client 160 for configuring an organization's segmentation policy associated with the segmentation system 105 and for viewing traffic flows associated with the workloads 138 in the administrative domain 150. The leader segmentation server 410 is furthermore responsible for creating pairing profiles for assigning labels to workloads 138. The pairing profiles may be replicated to each of the member segmentation servers 420 and stored locally by each of the member segmentation servers 420. Upon generating a new segmentation policy or updating an existing segmentation policy, the leader segmentation server 410 provides the segmentation policy to the member segmentation servers 420. Each of the segmentation servers 120 processes the segmentation policy to determine rules relevant to its respective paired workloads 138, generates management instructions for its respective paired workloads 138, and distributes the management instructions to the enforcement module 235 of the managed OS instance 230 on which the respective paired workloads 138 execute. Furthermore, each segmentation server 120 may receive traffic flow information describing communications to and from its respective paired workloads 138 and generate respective traffic flow graphs relating to the locally observed communications.

In some deployments, the leader segmentation server 410 is not paired with any managed workloads 138 executing on managed OS instances 230 in order to reduce load on the leader segmentation server 410 and free computing resources for performing other specialized functions attributed to the leader segmentation server 410 described in further detail below. In an embodiment, unmanaged workloads 138 executing on unmanaged OS instances 240 in an administrative domain 150 may be automatically assigned to the leader segmentation server 410.

Each segmentation server 120 in the segmentation system 105 may replicate copies of workload descriptions describing its respective paired workloads 138 to the other segmentation servers 120 in the cluster of segmentation servers 120 of the segmentation system 105. For example, replication may occur between the leader segmentation server 410 and one or more member segmentation servers 420 or directly between member segmentation servers 420. Thus, each segmentation server 120 stores records for every workload 138 in the administrative domain 150, thereby eliminating any single point of failure. However, each segmentation server 120 only computes and distributes management instructions for the respective workloads 138 with which it is paired. Replication of the workloads descriptions to other segmentation servers 120 may be triggered upon a change to a workload description (e.g., when a workload 138 is added, removed, or modified). In an embodiment, deltas are calculated between current stored workload descriptions and the updated workload descriptions. Then, only the deltas are replicated to the other segmentation servers 120 to minimize delays and make efficient use of bandwidth.

The segmentation servers 120 in the segmentation system 105 may be configured to provide support for other segmentation servers 120 in the cluster in the event of a failure. For example, if a member segmentation server 420-1 fails and remains offline for at least a threshold time period (e.g., 1 hour), its respective paired workloads 138 may be re-paired with one or more different member segmentation servers 420. In an embodiment, an optional load balancer 430 may determine how to re-assign workloads 138 in the event of a failure for best efficiency. In this embodiment, the enforcement modules 235 executing on the respective workloads 138 may store an identifier (e.g., a full qualified domain name) associated with the segmentation system 105. When all segmentation servers 120 are operational, the load balancer 430 resolves the segmentation server identifier to the closest segmentation server 120 based on geographic proximity. If the load balancer 430 detects that a particular segmentation server is non-operational for an extended period of time (e.g., 1 hour), it redirects the enforcement modules 235 of the workloads 138 paired with the non-operational segmentation server 120 to another segmentation server 120. All information needed for the new segmentation server 120 to continue servicing the workloads 138 is automatically replicated to the new segmentation server 120. Thus, no manual intervention is required when a failover occurs.

If a leader segmentation server 410 fails, the member segmentation servers 420 may continue to operate autonomously and continue to distribute the last provisioned segmentation policy to existing and newly paired workloads 138. In an embodiment, upon failure of the leader segmentation server 410, its respective paired workloads 138 may be re-paired with a member segmentation server 420, which may also be re-configured to operate in the role of the leader segmentation server 410.

The member segmentation servers 420 may optionally provide a read-only interface to enable an admin client 160 to connect directly to a member segmentation server 420 to access and view local traffic flows associated with workloads 138 managed by the member segmentation server 420. Typically, the read-only interface of a member segmentation server 420 does not enable generation of the segmentation policy, which is instead performed by the leader segmentation server 410.

The segmentation system 105 beneficially enables organizations with multiple regional or global data centers to have a distributed security control plane while maintaining centralized policy management and visibility. For example, in a typical deployment, a leader segmentation server 410 may be paired with workloads 138 in a first geographic region (e.g., the U.S.), a first member segmentation server 420-1 may be paired with workloads 138 in a second geographic region (e.g., Europe), and a second member segmentation server 420-N may be paired with workloads 138 in a third geographic region (e.g., Asia). Alternatively, workloads 138 may be paired with different segmentation servers 120 according to their roles or according to another label dimension.

The segmentation system 105 furthermore beneficially reduces policy convergence times for organization-wide policy changes affecting large numbers of workloads 138 by leveraging the full computing power of multiple distributed segmentation servers 120. Because each segmentation server 120 generates management instructions only for a limited number of paired workloads 138, overall computation time is significantly reduced relative to a single segmentation server 120 managing the same number of workloads 138. The segmentation system 105 can therefore scale seamlessly to any numbers of workloads 138 by scaling the number of member segmentation servers 420 with the number of workloads 138.

The segmentation system 105 also beneficially provides geographic diversity and multiple failure domains. Thus, for example, if workloads 138 are paired based on geographic region, a failure to a segmentation server 120 in one region will not affect management of workloads 138 in a different region paired with a different segmentation server 120. Furthermore, the segmentation system 105 can provide increased availability by enabling control of workloads 138 to be seamlessly transferred between segmentation servers 120 in the event of a failure.

In an embodiment, to further improve availability, each segmentation server 120 in the segmentation system 105 may be implemented as a multi-node cluster (MNC) capable of surviving a loss of up to half of the cluster. Each half of the MNC can be split across multiple LAN-connected buildings or availability zones (with a threshold latency between availability zones).

Figure 5:
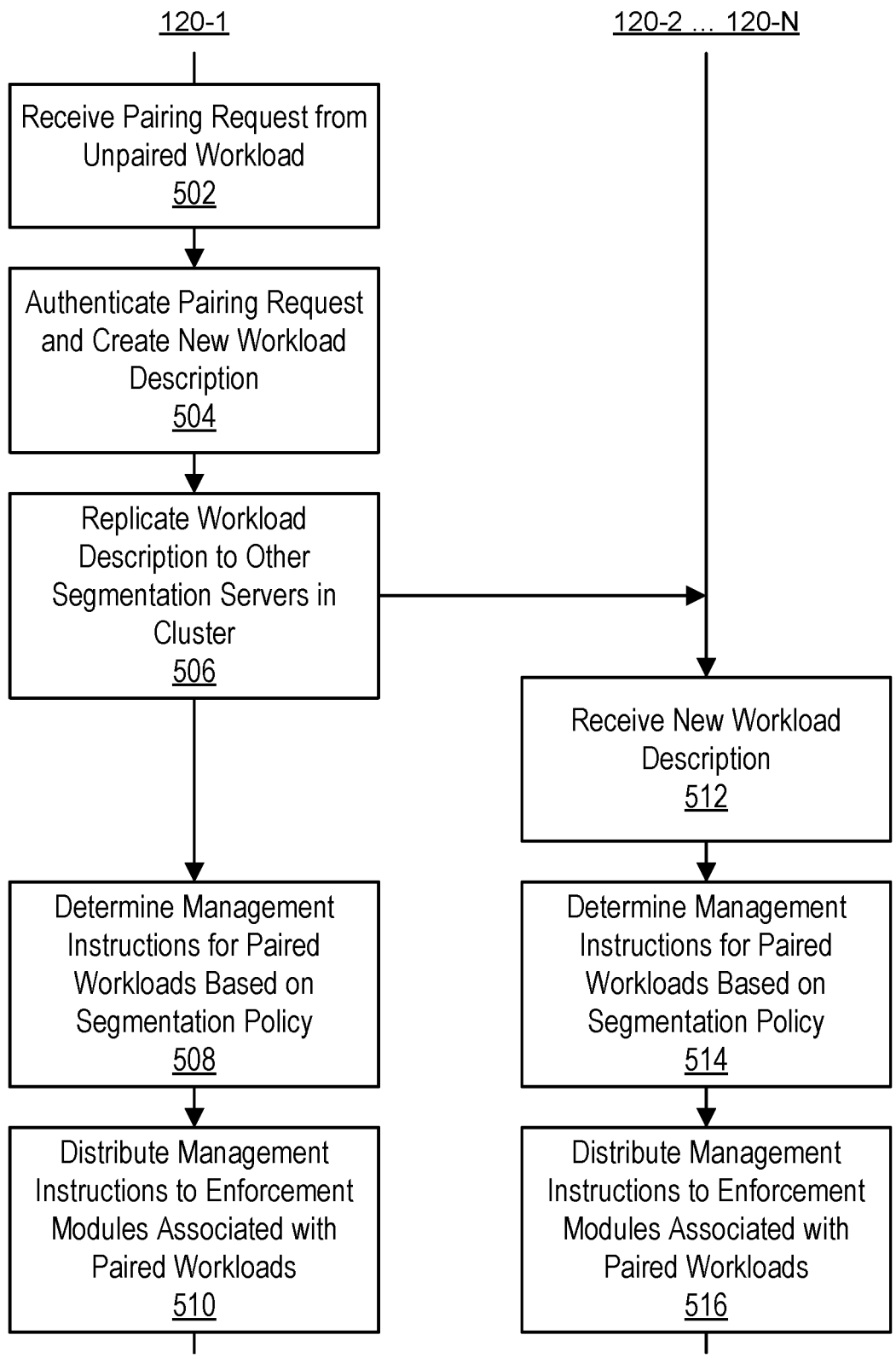
FIG. 5 is a flowchart illustrating an embodiment of a process for pairing a new workload with a segmentation system comprising a cluster of segmentation servers.

FIG. 5 illustrates an example embodiment of a process for pairing a new workload 138 with a segmentation server 120 within a segmentation system 105. A first segmentation server 120-1 (which may be a leader segmentation server 410 or a member segmentation server 420) receives 502 a pairing request from a workload 138. The segmentation server 120-1 authenticates 504 the pairing request and creates a new workload description for the workload 138 storing its assigned labels and other information. The segmentation server 120-1 replicates 506 the workload description for the new workload 138 to all of the other segmentation servers 120-2, . . . , 120-N (which may include a leader segmentation server 410, one or more member segmentation servers 420, or both) in the segmentation system 105. The segmentation server 120-1 determines 508 management instructions for controlling its paired workloads 138 based on the addition of the new workload 138 and distributes 510 the management instructions to the managed OS instance 230 associated with the respective paired workloads 138. As explained above, the segmentation server 120-1 may distribute the management instructions only to the managed OS instances 230 associated with workloads 138 that are permitted to communicate with the new workload 138 for efficiency of distribution. The other segmentation servers 120-2, . . . , 120-N each receive 512 the new workload description for the workload 138 being paired with the first segmentations server 120-1. The segmentation servers 120-2, . . . , 120-N determine 514 management instructions for controlling their respective paired workloads 138 that are allowed to communicate with the new workload 138 and distribute 516 the management instructions to the respective enforcement modules 235 associated with the paired workloads 138.

Changes to a description of a workload 138 (e.g., changes to assigned labels, IP address changes, changes to an online/offline status, etc.) may be handled similarly to pairing a new workload 138. Particularly, the segmentation server 120 managing the workload 138 with the changed description detects the changes, re-calculates the management instructions, and re-distributes the management instructions to the enforcement modules 235 associated with the paired workloads 138. The segmentation server 120 also replicates information about the change to the other segmentation servers 120 which similarly re-calculate and re-distribute management instructions to the enforcement modules 235 associated with any of their respective paired workloads 138 that are affected by the change.

Figure 6:
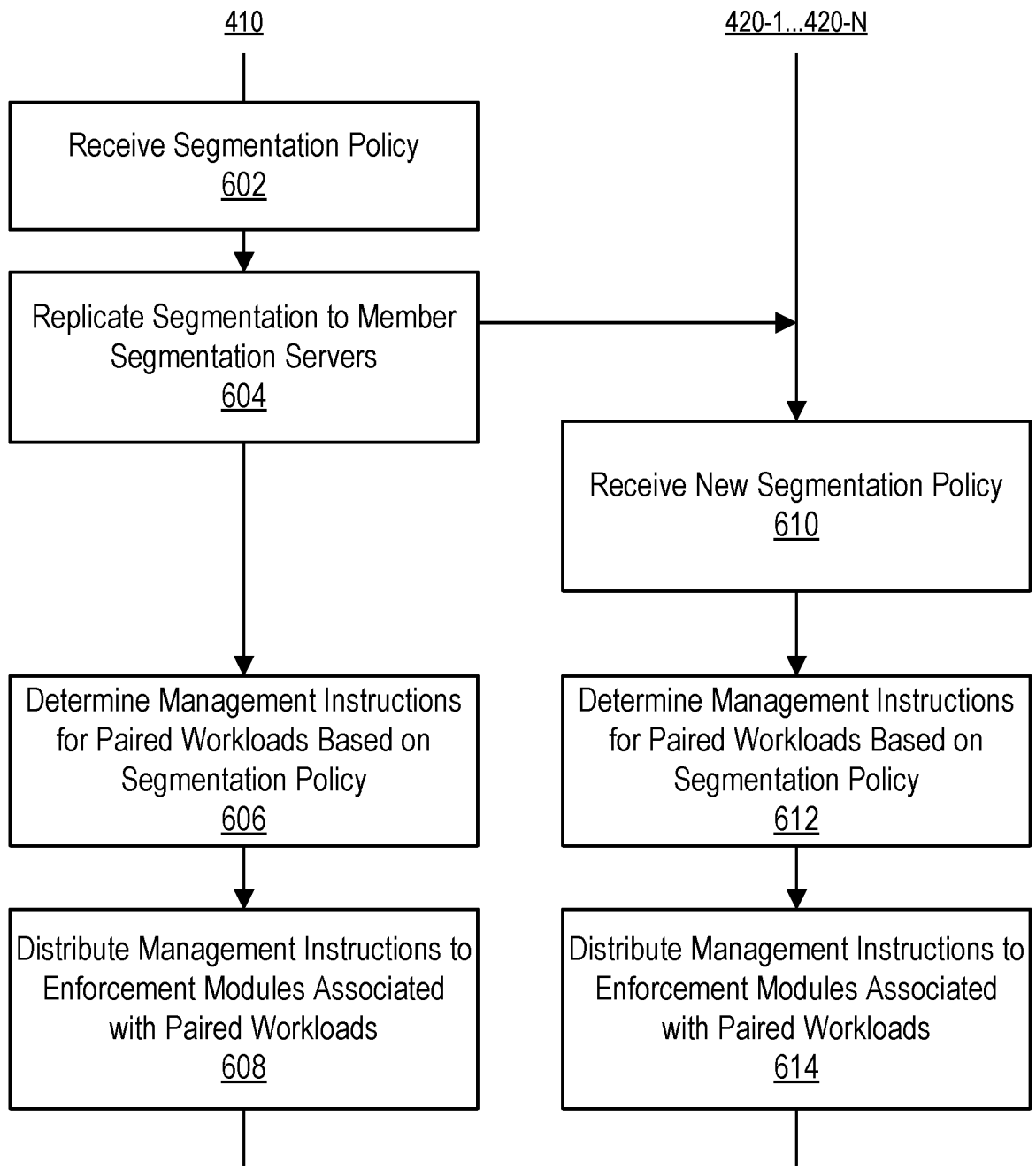
FIG. 6 is a flowchart illustrating an embodiment of a process for updating a segmentation policy of a segmentation system comprising a cluster of segmentation servers.

FIG. 6 illustrates an embodiment of a process for updating a segmentation policy in a segmentation system 105. A segmentation policy (or a change to a segmentation policy) is received 602 at a leader segmentation server 410. The leader segmentation server 410 replicates 604 the updated segmentation policy to one or more member segmentation servers 420 (e.g., member segmentation servers 420-1, . . . , 420-N). The leader segmentation server 410 determines 606 management instructions for controlling its paired workloads 138 based on the new segmentation policy and distributes 606 the management instructions to the enforcement modules 235 associated with the respective paired workloads 138. Each member segmentation server 420 receives 610 the new segmentation policy from the leader segmentation server 410. Each member segmentation server 420 then determines 612 management instructions for controlling its respective paired workloads 138 and distributes 614 the management instructions to the enforcement modules 235 associated with its respective paired workloads 138.

Figure 7:
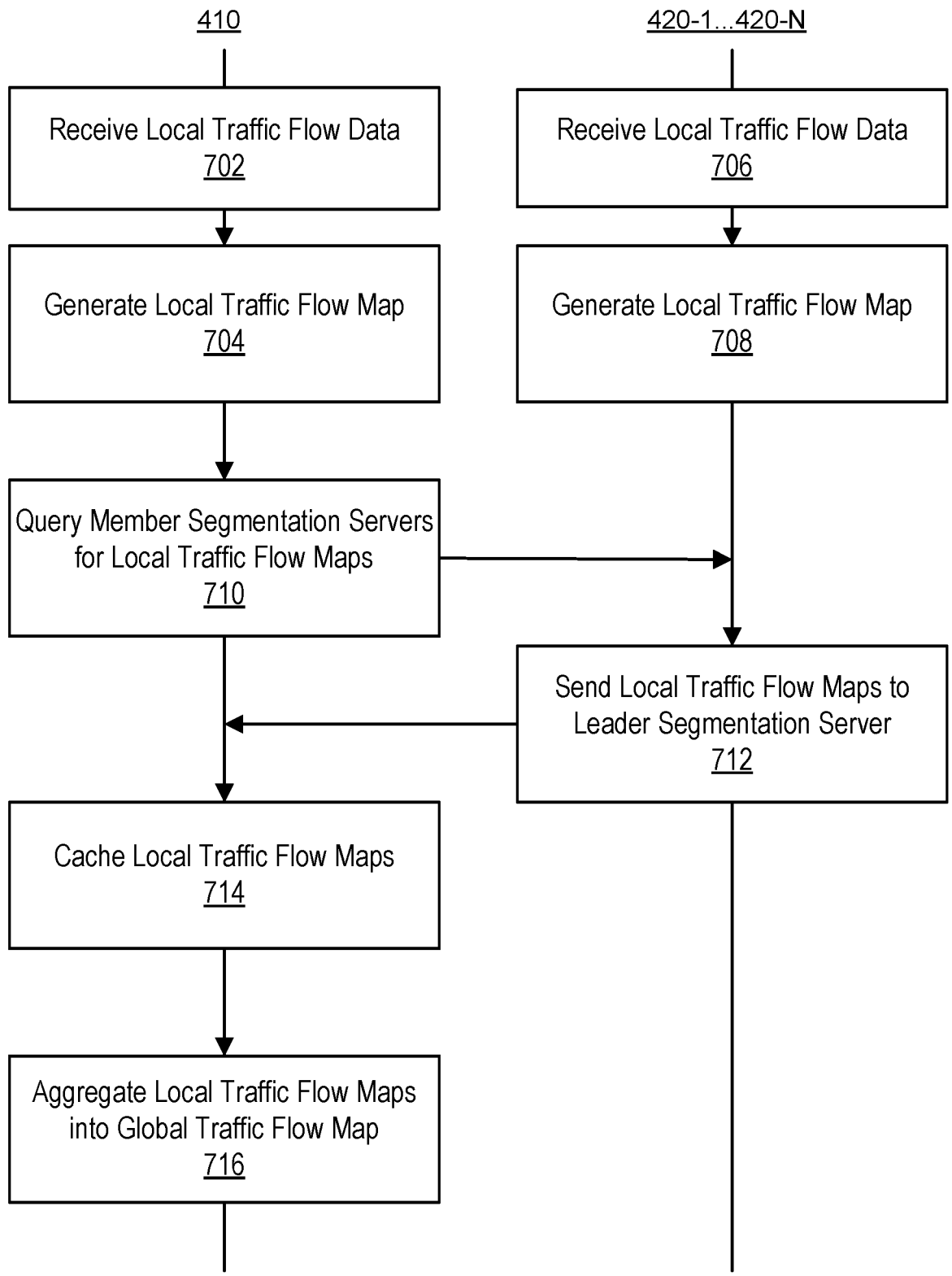
FIG. 7 is a flowchart illustrating an embodiment of a process for generating a global traffic flow graph in a segmentation system comprising a cluster of segmentation servers.

FIG. 7 illustrates an embodiment of a process for generating a global traffic flow graph representing communications between workloads 138 controlled by a segmentation system 105. The leader segmentation server 410 receives 702 local traffic flow data observed to and from its respective paired workloads 138 and generates 704 local traffic flow graph describing the observed traffic. The member segmentation servers 420 (e.g., member segmentation servers 420-1, . . . , 420-N) similarly receive 706 local traffic flow data observed to and from their respective paired workloads 138 and each generate 708 a respective local traffic flow graph describing the observed traffic. The leader segmentation server 410 may periodically query 710 the member segmentation servers 420 for their respective local traffic flow graphs. In response to the query, the member segmentation servers 420 send 712 their respective local traffic flow graphs to the leader segmentation server 410. The leader segmentation server 410 caches 714 the local traffic flow graphs. The leader segmentation server 410 may then aggregate 716 the local traffic flow graphs generated on the member segmentation servers 420 and the local traffic flow graph generated by the leader segmentation server 410 to generate a global traffic flow graph representing the aggregate traffic across the workloads 138 under control of the segmentation system 105. Caching the local traffic flow graphs at the leader segmentation server 410 beneficially enables the global traffic flow graph to be available even when a member segmentation server 420 is offline. In an embodiment, the leader segmentation server 410 may optionally request a stream of the raw traffic flow data (i.e., before being combined into a local traffic flow graph) from a particular member segmentation server 420 (e.g., using a log collector).

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for managing a segmentation policy, the method comprising:
   obtaining a segmentation policy by a leader segmentation server, the segmentation policy comprising a set of permissive rules that specify permitted communications between a plurality of workloads, wherein communications between the plurality of workloads that are not explicitly allowed by the permissive rules are blocked;
   pairing a first subset of paired workloads of the plurality of workloads with a first member segmentations server, wherein pairing includes storing workloads descriptions associated with each of the first subset of paired workloads;
   distributing, by the leader segmentation server, the segmentation policy to the first member segmentation server paired with the first plurality of paired workloads;
   generating, by the first member segmentation server from the segmentation policy, first management instructions for controlling communications of the first subset of paired workloads, the first management instructions including a first subset of the permissive rules of the segmentation policy that specify permitted communications to or from the first subset of paired workloads;
   distributing, by the first member segmentation server, the first management instructions to first operating system instances executing the first subset of paired workloads to enable the first operating system instances to configure respective local traffic filters of the first operating system instances to allow the communications permitted by the first management instructions and block communications that are not explicitly allowed by the first management instructions;
   pairing a new workload with the first member segmentation server;
   in response to the new workload being paired to the first member segmentation server, replicating copies of the workload descriptions associated with the first subset of paired workloads to the leader segmentation server and to a second member segmentation server;
   in response to the new workload being paired to the first member segmentation server, generating, by the first member segmentation server, updated first management instructions for controlling communications of the first subset of paired workloads with the new workload in accordance with the segmentation policy, the updated first management instructions specifying permitted communications between the first subset of paired workloads and the new workload; and
   distributing, by the first member segmentation server, the updated first management instructions to the first operating system instances to enable the first operating system instances to configure the respective local traffic filters to allow the communications permitted by the updated first management instructions and block communications that are not explicitly allowed by the first management instructions.

2. The method of claim 1, further comprising:
   distributing, by the leader segmentation server, the segmentation policy to a second member segmentation server paired with a second subset of paired workloads of the plurality of workloads;
   generating, by the second member segmentation server based on the segmentation policy, second management instructions for controlling communications of the second subset of paired workloads, the second management instructions including a second subset of the permissive rules of the segmentation policy that specify permitted communications to or from the second subset of paired workloads;
   distributing, by the second member segmentation server, the second management instructions to second operating system instances executing the second subset of paired workloads to enable the second operating system instances to configure respective local traffic filters to allow the communications permitted by the second management instructions and block communications that are not explicitly allowed by the second management instructions.

3. The method of claim 1, wherein the leader segmentation server is paired with a third subset of paired workloads of the plurality of workloads, the method further comprising:
   generating, by the leader member segmentation server from the segmentation policy, third management instructions for controlling communications of the third subset of paired workloads, the third management instructions including a third subset of the permissive rules of the segmentation policy that specify permitted communications to or from the third subset of paired workloads; and
   distributing, by the leader member segmentation server, the third management instructions to third operating system instances executing the third subset of paired workloads to enable the third operating system instances to configure respective local traffic filters to allow the communications permitted by the third management instructions and block communications that are not explicitly allowed by the third management instructions.

4. The method of claim 1, further comprising:
   generating, by the second member segmentation server, updated second management instructions for controlling communications with the new workload by a second subset of paired workloads of the plurality of workloads that are paired with the second member segmentation server in accordance with the segmentation policy; and
   distributing, by the second member segmentation server, the updated second management instructions to second operating system instances executing the second subset of paired workloads.

5. The method of claim 1, further comprising:
   generating by the first member segmentation server, a first local traffic flow graph representing traffic to and from each of the first subset of paired workloads;
   generating by the second member segmentation server, a second local traffic flow graph representing traffic to and from each of a second subset of workloads of the plurality of workloads;
   querying from the leader segmentation server, the first local traffic flow graph from the first member segmentation server and the second local traffic flow graph from the second member segmentation server; and combining, by the leader segmentations server, the first local traffic flow graph from the first member segmentation server and the second local traffic flow graph from the second member segmentation server to generate a global traffic flow graph.

6. The method of claim 5, further comprising:
generating, by the leader segmentation server, an updated segmentation policy based on the global traffic flow graph;
transmitting by the leader segmentation server, the updated segmentation policy to the first member segmentation server;
generating, by the first member segmentation server, further updated first management instructions that specify permitted communications to or from the first subset of paired workloads with the new workload in accordance with the updated segmentation policy; and
distributing, by the first member segmentation server, the updated first management instructions to the first operating system instances.

7. The method of claim 1, further comprising:
detecting, by a load balancer, an outage of the first member segmentation server exceeding a threshold time period; and
causing, by the load balancer, the first plurality of paired workloads to be paired with the second member segmentation server in response to the outage.

8. The method of claim 1, wherein the first subset of permissive rules comprises a rule allowing a first workload of the first subset of paired workloads operating on a first operating system instance to provide a particular service to a second workload of the first subset of paired workloads operating on a second operating system instance.

9. The method of claim 8, wherein the rule further specifies that the first workload can communicate with the second workload using encrypted communication only.

10. A segmentation system for managing a segmentation policy, the segmentation system comprising:
a leader segmentation server configured to:
obtain a segmentation policy, the segmentation policy comprising a set of access control rules that control a set of permissive rules that specify permitted communications between a plurality of workloads, wherein communications between the plurality of workloads that are not explicitly allowed by the permissive rules are blocked; and
distribute the segmentation policy to a plurality of member segmentation servers; and
a first member segmentation server of the plurality of member segmentation servers, the first member segmentation server configured to:
receive the segmentation policy from the leader segmentation server;
pair with a first subset of paired workloads of the plurality of workloads, wherein pairing includes storing workloads descriptions associated with each of the first subset of paired workloads;
generate, from the segmentation policy, first management instructions for controlling communications of the first subset of paired workloads, the first management instructions including a first subset of the permissive rules of the segmentation policy that specify permitted communications to or from the first subset of paired workloads; and
distribute the first management instructions to first operating system instances executing the first plurality of paired workloads to enable the first operating system instances to configure respective local traffic filters of the first operating system instances to allow the communications permitted by the first management instructions and block communications that are not explicitly allowed by the first management instructions;
pair a new workload with the first member segmentation server;
in response to the new workload being paired to the first member segmentation server, replicate copies of the workload descriptions associated with the first subset of paired workloads to the leader segmentation server and to a second member segmentation server;
in response to the new workload being paired to the first member segmentation server, generate updated first management instructions for controlling communications of the first subset of paired workloads with the new workload in accordance with the segmentation policy, the updated first management instructions specifying permitted communications between the first subset of paired workloads and the new workload; and
distribute the updated first management instructions to the first operating system instances to enable the first operating system instances to configure the respective local traffic filters to allow the communications permitted by the updated first management instructions and block communications that are not explicitly allowed by the first management instructions.

11. The segmentation system of claim 10, further comprising:
a second member segmentation server of the plurality of member segmentation servers, the second member segmentation server configured to:
generate, from the segmentation policy, second management instructions for controlling communications of a second subset of paired workloads of the plurality of workloads, the second management instructions including a second subset of the permissive rules of the segmentation policy that specify permitted communications to or from the second subset of paired workloads; and
distribute the second management instructions to second operating system instances executing the second subset of paired workloads to enable the second operating system instances to configure respective local traffic filters to allow the communications permitted by the second management instructions and block communications that are not explicitly allowed by the second management instructions.

12. The segmentation system of claim 11,
wherein the first member segmentation server is further configured to generate a first local traffic flow graph representing traffic to and from each of the first subset of paired workloads;
wherein the second member segmentation server is further configured to generate a second local traffic flow graph representing traffic to and from each of the second subset of paired workloads;
wherein the leader segmentation server is further configured to:
query the first local traffic flow graph from the first member segmentation server and the second local traffic flow graph from the second member segmentation server; and
combine the first local traffic flow graph from the first member segmentation server and the second local traffic flow graph from the second member segmentation server to generate a global traffic flow graph.

13. The segmentation system of claim 12,
wherein the leader segmentation server is further configured to:
generate an updated segmentation policy based on the global traffic flow graph;
transmit the updated segmentation policy to the first member segmentation server;
wherein the first member segmentation server is further configured to:
generate updated first management instructions for controlling communications of the first subset of paired workloads with the new workload in accordance with the updated segmentation policy; and
distribute the updated first management instructions to the first operating system instances.

14. The segmentation system of claim 10, wherein the leader segmentation server is paired with a third subset of paired workloads of the plurality of workloads, wherein the leader segmentation server is further configured to:
generate, from the segmentation policy, third management instructions for controlling communications of the third subset of paired workloads, the third management instructions including a third subset of the permissive rules of the segmentation policy that specify permitted communications to or from the third subset of paired workloads;
distribute the third management instructions to third operating system instances executing the third subset of paired workloads to enable the third operating system instances to configure respective local traffic filters to allow the communications permitted by the third management instructions and block communications that are not explicitly allowed by the third management instructions.

15. The segmentation server of claim 10, wherein the second member segmentation server is configured to generate updated second management instructions for controlling communications, in accordance with the segmentation policy, with the new workload by a second subset of paired workloads of the plurality of workloads that are paired with the second member segmentation server, and distribute the updated second management instructions to second operating system instances executing the second subset of paired workloads.

16. The segmentation system of claim 10,
wherein the leader segmentation server is further configured to:
obtain an update to the segmentation policy;
transmit the update to the plurality of member segmentation servers;
wherein the first member segmentation server is further configured to:
generate further updated first management instructions that specify permitted communications to or from the first subset of paired workloads with the new workload in accordance with the update to the segmentation policy; and
distribute the updated first management instructions to the first operating system instances.

17. The segmentation system of claim 10, further comprising:
a load balancer server configured to:
detect an outage of the first member segmentation server exceeding a threshold time period; and
cause the first subset of paired workloads to be paired with the second member segmentation server in response to the outage.

18. The segmentation system of claim 10, wherein the first subset of permissive rules comprises a rule allowing a first workload of the first subset of paired workloads operating on a first operating system instance to provide a particular service to a second workload of the first subset of paired workloads operating on a second operating system instance.

19. The segmentation system of claim 18, wherein the rule further specifies that the first workload can communicate with the second workload using encrypted communication only.

* * * * *